United States Patent [19]
Wood

[11] Patent Number: 5,640,999
[45] Date of Patent: Jun. 24, 1997

[54] VENTING CAP FOR FILL PIPE

[75] Inventor: Chester Wood, Cincinnati, Ohio

[73] Assignee: Dover Corporation, New York, N.Y.

[21] Appl. No.: 480,755

[22] Filed: Jun. 7, 1995

[51] Int. Cl.$^6$ ............................................. F16L 55/115
[52] U.S. Cl. ................... 138/89; 138/89.3; 138/96 T; 220/203.27; 220/303; 220/367.1
[58] Field of Search .................. 138/89, 89.3, 96 T; 220/203.27, 303, 367.1, 210

[56] References Cited

U.S. PATENT DOCUMENTS

| | | | |
|---|---|---|---|
| 2,946,215 | 7/1960 | Eshbaugh et al. | 220/210 |
| 3,653,410 | 4/1972 | West | 138/89 |
| 3,672,403 | 6/1972 | Wilson . | |
| 3,868,132 | 2/1975 | Racine | 138/89 |
| 4,098,427 | 7/1978 | Duckworth, Jr. | 138/89 |
| 4,339,054 | 7/1982 | Kellogg | 220/203.27 |
| 4,351,446 | 9/1982 | Madden | 138/89 |
| 4,716,938 | 1/1988 | Weh et al. | 138/89 |
| 5,135,024 | 8/1992 | LeBlanc et al. | 220/203.27 |
| 5,255,294 | 10/1993 | Bierwirth | 138/89 |
| 5,392,816 | 2/1995 | Hagenberg et al. | 138/89 |

*Primary Examiner*—David Scherbel
*Assistant Examiner*—James F. Hook

[57] ABSTRACT

An apparatus and method for sealing and accessing the end of a fill pipe connected to a pressurized fuel reservoir. The cap has a body, a sealing member for sealing between the cap and the adapter ring, a fastening system for fastening the cap body to the end of the pipe, and a valve system for venting the pressurized gaseous media in fuel reservoir. The valve system has an inlet exposed to the pressurized gaseous media contained in the fuel reservoir, an outlet exposed to a volume external to the reservoir. A flow path extends through the cap body between the inlet and the outlet, and a valving member movably disposed in the flow path that is adapted for manual activation to selectively provide fluid communication between the inlet and the outlet.

12 Claims, 5 Drawing Sheets

VENTING CAP FOR FILL PIPE

TECHNICAL FIELD

The invention relates generally to a cap for sealing the end of a pipe and more particularly to a venting cap for sealing the end of a fill pipe connected to a pressurized fuel reservoir. The invention will be specifically disclosed in connection with a cap for a fill pipe for an underground storage tank.

BACKGROUND OF THE INVENTION

Subterranean reservoirs are commonly used to store fuels such as gasoline. Such fuel reservoirs are typically accessed through a fill pipe that leads from the ground surface to the fuel reservoir. Generally, the inlet to these fill pipes are recessed into pavement. Very common examples of this type of fuel reservoir are the gasoline fuel reservoirs used in automobile service stations.

Removable caps have long been used to seal the inlet of fill pipes. Such removable caps prevent fumes from escaping from the reservoir and keep the contents of the reservoir free from contaminants while allowing easy access to the reservoir for filling or servicing. Because these caps are fume-tight and the reservoirs are not always vented, pressure buildup sometimes occurs for a variety of reasons. For example, the volatile nature of many fuels, such as gasoline, readily change phase from liquid to vapor resulting in vapor pressure. This effect can be aggravated when the fuel reservoir is heated, as for example, when the sun radiates the paved surface over a fuel reservoir. Pressure buildup in fuel reservoirs can also occur due to vapor recovery systems used during the fuel dispensing process. Such vapor recovery systems force the recovered fumes back into the fuel reservoirs thus escalating the reservoir pressure. Whatever the source, the aggregate result is that fuel reservoirs can become highly pressurized.

While a highly pressurized fuel reservoir can cause problems when an operator removes the cap to access the reservoir, a sealed reservoir capable of containing high pressure is desirable when the tank is not being accessed. As is evident to one skilled in the art, pressurized fuel vapors contain significant amount of potential chemical energy. In a pressurized environment, portions of those vapors will diffuse back into the liquid fuel thus partially recovering potential chemical energy. In addition, a reservoir capable of containing high pressures will also prevent environmental pollution that may result is fuel vapors are released into the atmosphere. Therefore, fill pipe caps must have the capability of sealing high pressures within the fuel reservoir.

Caps for fill pipes must also satisfy a variety of other design constraints. For example, caps for fill pipes should be rugged enough to survive rough handling or outright abuse by operators. Additionally, caps for fill pipes should have a sufficiently low profile to fit within the recessed cavity between the inlet of the fill pipe and the surface of the pavement. A further design constraint is that caps for fill pipes should have the ability to lock and prevent unauthorized access to the fuel reservoir. Still other design constraints are apparent to one skilled in the art.

Thus, there is a need for a cap to seal the end of a fill pipe connected to a pressurized fuel reservoir, which eliminates the attendant problems.

SUMMARY OF THE INVENTION

Accordingly, an object of this invention is to provide a cap for sealing the end of a pipe, which allows an operator to reduce the pressure contained by the cap prior to removing the cap from the fill pipe.

Another object of this invention is to provide a rugged, low profile, and lockable cap for sealing the end of a pipe, which allows an operator to reduce the pressure contained by the cap prior to removing the cap from the fill pipe.

A further object of this invention is to provide a rugged, low profile, and lockable cap for sealing the end of a fill pipe connected to a pressurized fuel reservoir, which allows an operator to reduce the pressure in the fuel reservoir prior to removing the cap from the fill pipe.

Yet a further object of this invention is to provide a process for an operator to remove a cap used for sealing the end of a fill pipe connected to a pressurized fuel reservoir.

Additional objects, advantages, and novel features of the invention will be set forth in part in the description that follows and in part will become apparent to those skilled in the art upon examining or practicing the invention. The objects and advantages of the invention may be realized and obtained by means of the instrumentalities and combinations particularly pointed out in the appended claims.

To achieve the foregoing and other objects of this invention, a fill pipe is provided having one end connected to a fuel reservoir containing pressurized gaseous media and the other end connected to an adapter ring. A cap for sealing the end of the fill pipe is mounted onto the end the adapter ring. The cap comprises a cap body, a sealing member, a fastening system, and a valve system. The cap body has an inner surface adapted for at least partial exposure to the pressurized gaseous media contained in the fuel reservoir and an outer surface adapted for a least partial exposure to ambient atmosphere. The sealing member is sealingly disposed between the inner surface of the cap body and the adapter ring for sealing between the same. The fastening system provides a means for fastening the cap body to the adapter ring. The valve system is used for venting the pressurized gaseous media in the fuel reservoir. The valve system comprises an inlet exposed to the pressurized gaseous media contained in the fuel reservoir, an outlet exposed to a volume external to the fuel reservoir, and a flow path extending through the cap body between the inlet and the outlet. The valve system also comprises a valving member movably disposed in the flow path adapted for manual activation to selectively provide fluid communication between the inlet and the outlet.

A further aspect of the invention, in accordance with its objectives and purposes, is a method for accessing the end of a fill pipe that is sealed by a cap and connected to a fuel reservoir containing pressurized gaseous media, comprising four steps. First, manually opening a valve system having a flow path extending through the cap, the flow path having one end exposed to the pressurized gaseous media contained in the fuel reservoir and the other end exposed to a volume external to the reservoir, to selectively provide fluid communication between the pressurized gaseous media and the volume external to the reservoir. Second, reducing the pressure in the fuel reservoir by releasing the pressurized media contained in the reservoir to the volume external to the reservoir. Third, unfastening the cap from the end of the fill pipe. Fourth, removing the cap from the end of the fill pipe.

Still other objects and aspects of the present invention will become apparent to those skilled in the art from the following description of a preferred embodiment, which is simply by way of illustration one of the best modes contemplated for carrying our the invention. As will be realized, the invention is capable of other different obvious aspects all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and together with the description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

Figure 1:
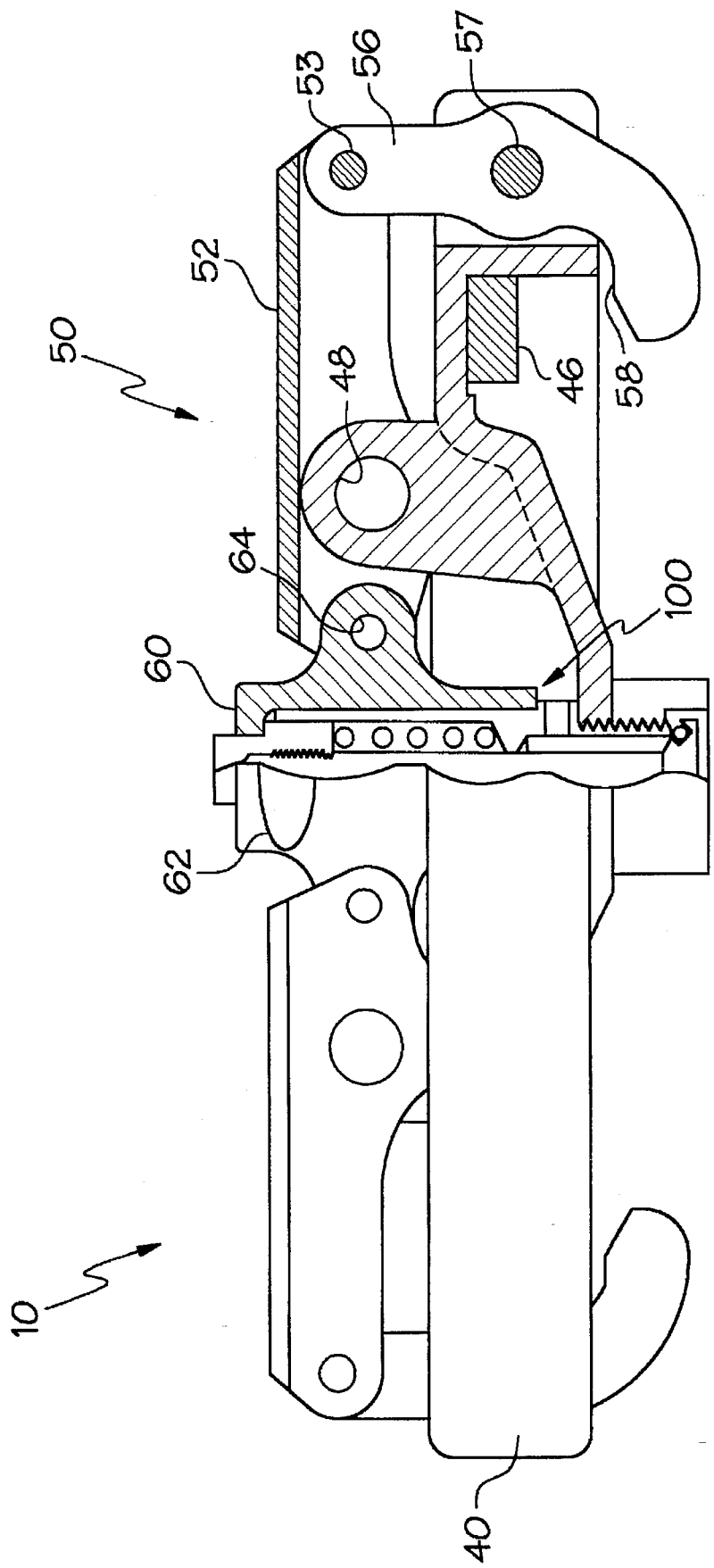
FIG. 1 shows a partial cross-sectional side view of a venting cap for sealing the end of a fill pipe made in accordance with the present invention.

FIG. 1 shows a partial cross-sectional side view of a venting cap 10 made in accordance with the present invention. The cap 10 has a cap body 40 having an inner surface 42 and an outer surface 44. The inner surface 42 is adapted for at least partial exposure to the pressurized gaseous media contained in the fuel reservoir. The outer surface 44 is adapted for at least partially exposure to ambient atmosphere. The cap 10 also has a gasket seal 46 that acts as a sealing member for sealing between the inner surface 42 of the cap body 40 and the end of the pipe (discussed in detail below). For illustrative purposes, the pipe can be connected to an underground fuel reservoir.

The cap 10 includes a fastening system 50 for fastening the cap body 40 to the end of the pipe. As one skilled in the art will readily appreciate, the preferred fastening system 50 has two identical sets of linkages that share the same mechanics and components. One such set of linkages is assembled as follows. First, the cam 56 is attached to the cap body 40 using a pin 57 such that the cam 56 can rotate relative to the cap body 40 about the pin 57. Similarly, the link 52 is attached to the handle 60 using a pin 64 such that the link 52 can rotate relative to the handle 60 about the pin 64. Lastly, the link 52 is attached to the cam 56 using a pin 53 such that the link 52 and the cam 56 can rotate relative each other about the pin 53.

The cap 10 also includes a valve system 100 for venting the pressurized gaseous media contained by the cap 10. The valve system 100 has an inlet 125 exposed to the pressurized gaseous media contained in the fuel reservoir, an outlet 126 exposed to a volume external to the fuel reservoir, preferably the ambient atmosphere, and a flow path 124 extending through the cap body 40 between the inlet 125 and the outlet 126. The valve system 100 also has a valving member 102 movably disposed in the flow path 124 adapted for manual activation to selectively provide fluid communication between the inlet 125 and the outlet 126.

Figure 2:
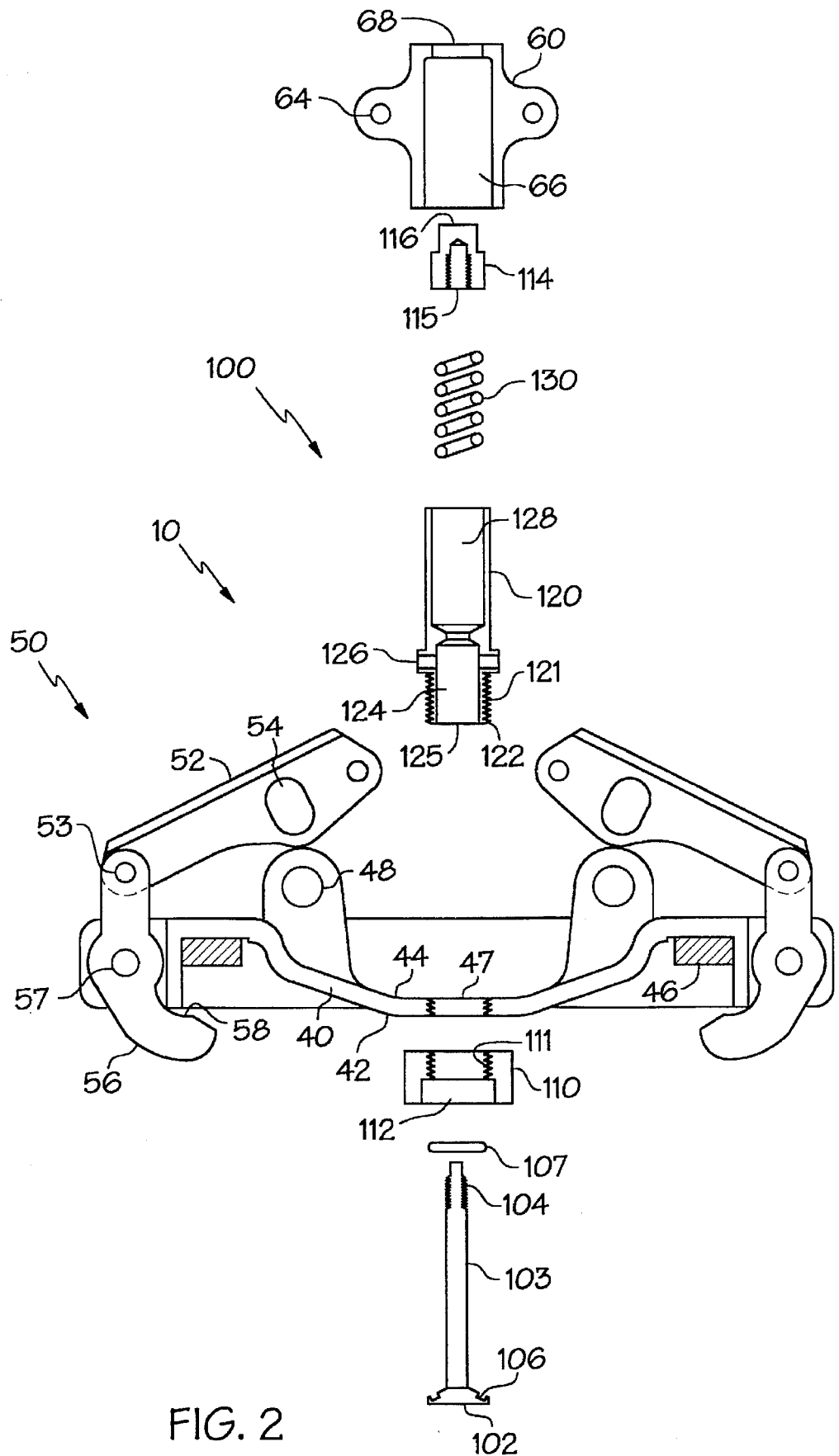
FIG. 2 shows an exploded cross-sectional side view of the venting cap illustrated in FIG. 2.

As best illustrated in FIG. 2, the preferred valve system 100 is assembled as follows. First, the valve body 120 is screwed through the threaded hole 47 of the cap body 40. The retainer cage 110 is then fastened to the valve body 120 using the threads 111 and 121 such that the valve body 120 is rigidly affixed to the cap body 40 and the hole 47 is sealed. Next, the O-ring 107 is passed around the valve stem 103 and fitted into the O-ring groove 106 on the valving member 102. The valve stem 103 is then inserted through the retainer cage 110 and into the valve body 120 until the O-ring is seated on the valve seat 122. The spring 130 is then place in the spring cavity 128 and around the valve stem 103. Simultaneously, the retainer cap 114 is inserted in the spring cavity 128, pushed to compress the spring 130, and turned to fasten threads 115 and 104. Lastly, the handle 60 is then slid over the valve system 100 such that the valve body 120 is at least partially enclosed by the handle cavity 66.

Figure 3:
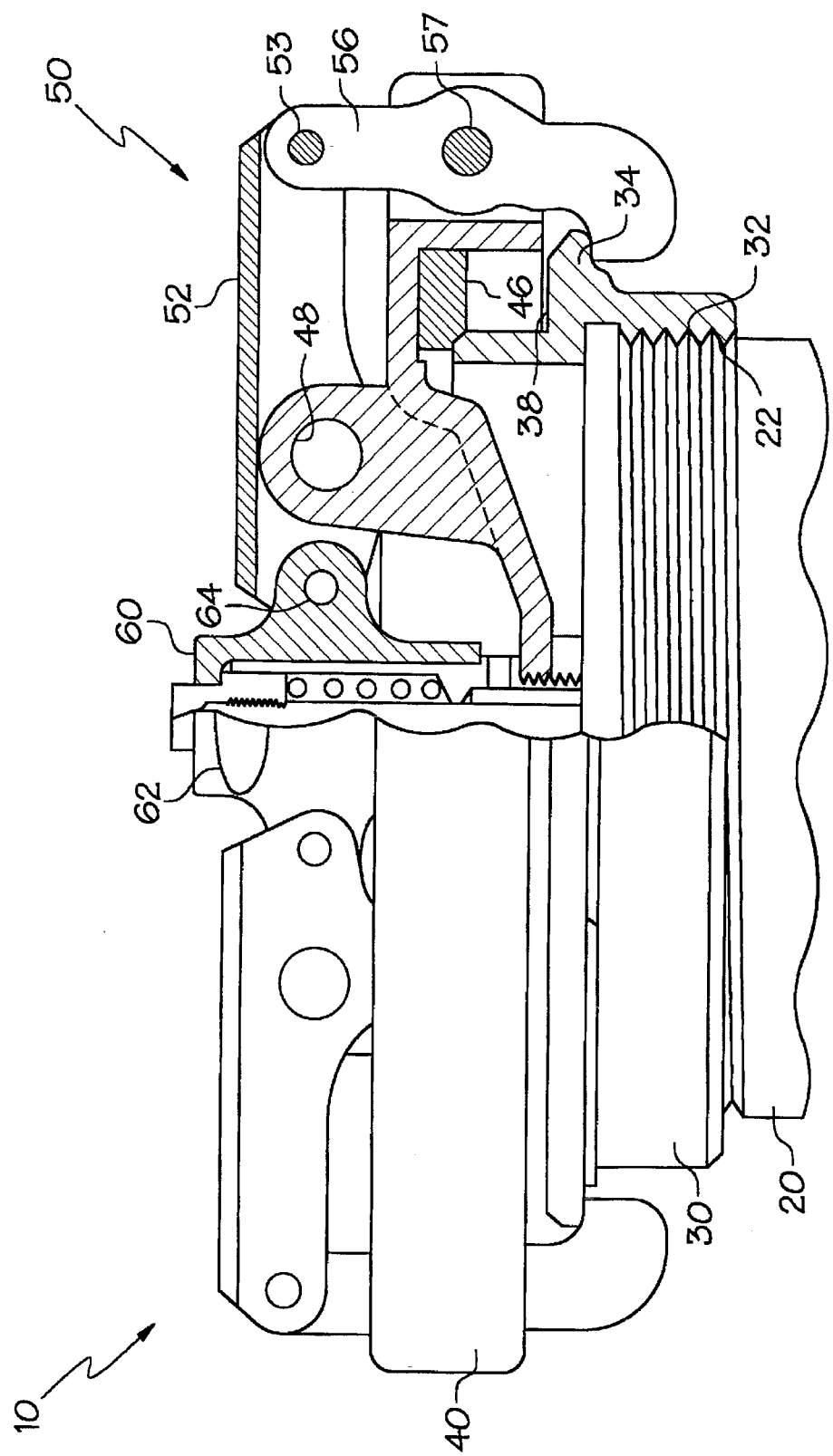
FIG. 3 shows a partial cross-sectional side view of the venting cap illustrated in FIG. 1 in the fastened position attached to the end of a fill pipe.

FIGS. 3 shows a partial cross-sectional side view of a venting cap 10 mounted onto an adapter ring 30 in the fastened and unfastened positions, respectively. The adapter ring 30 is connected to the end of the fill pipe using cooperating threads 22 and 32. The adapter ring 30 includes a circumfrential flange 34 having a flat face 36 to facilitate the cap 10 fastening to the adapter ring 30. Additionally, the adapter ring 30 includes a sealing surface 38 to receive the gasket seal 46. The fill pipe 20 is connected to a fuel reservoir containing a fuel such as gasoline and pressurized gaseous media. If the reservoir were underground, the fill pipe 20 may extend upward from the reservoir to ground level.

Figure 4:
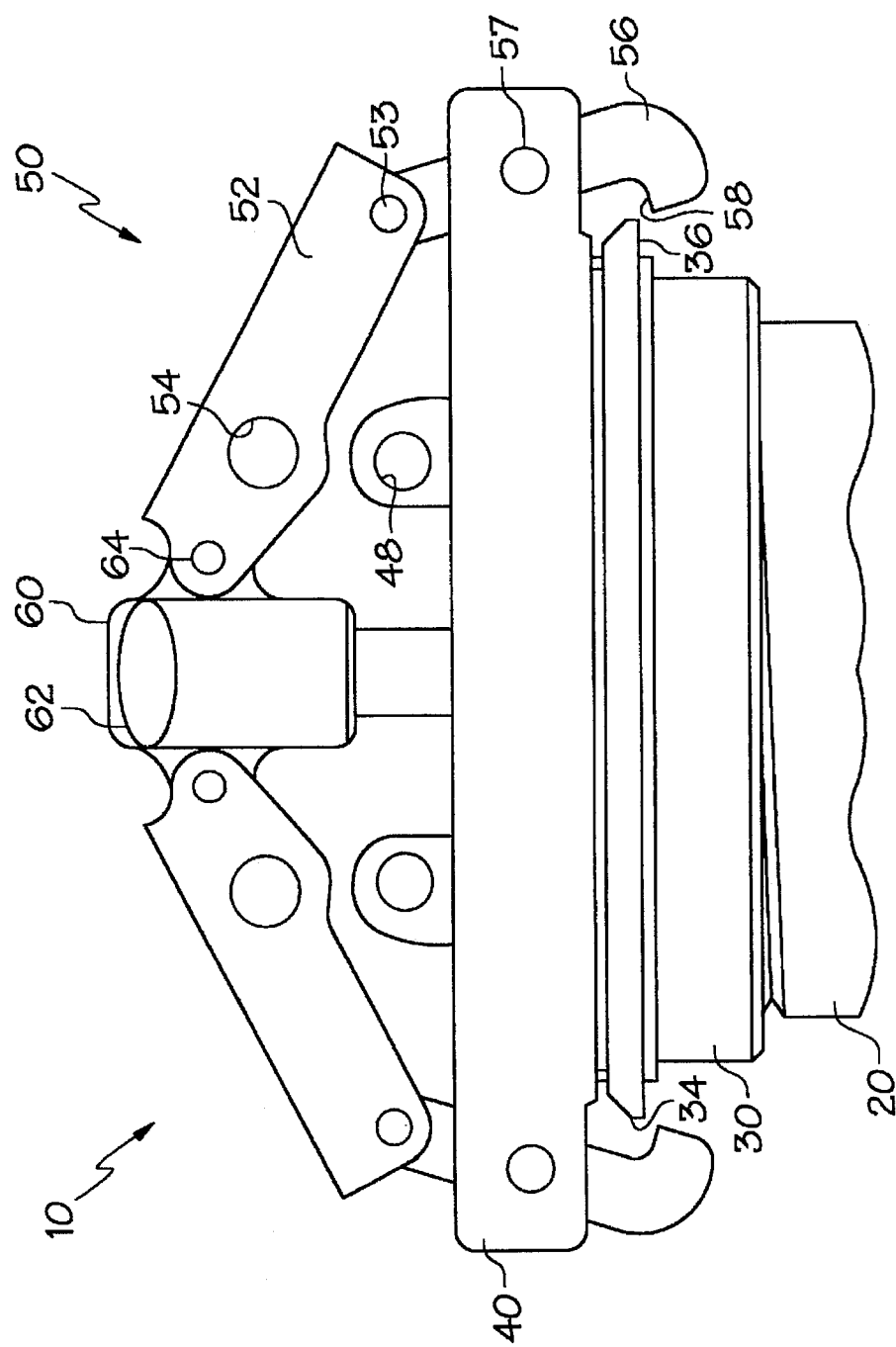
FIG. 4 shows a side view of the venting cap illustrated in FIG. 3 in the unfastened position.
Figure 5:
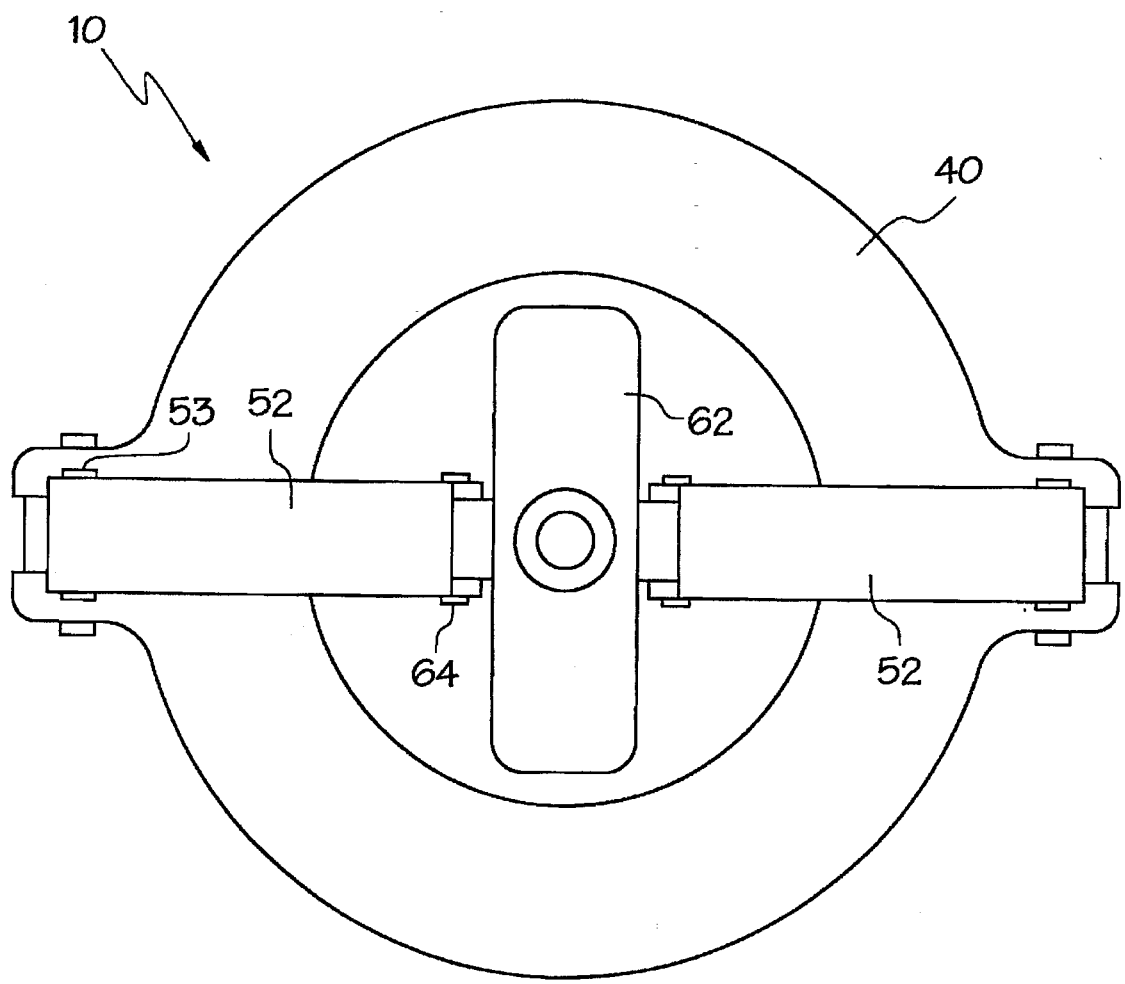
FIG. 5 shows top view of the venting cap illustrated in FIG. 1.

The fastening system 50 is manually operated by pulling or pushing the handle grip 62. The handle 60 in turn moves relative to the cap body 40 with the valve body 120 acting as a guide. As is evident to one skilled in the art, the handle 60 acts on the link 52 which in turn acts on the cam 56. In the unfastened position, as shown in FIG. 4, the handle 60 is in its most upward position away from the cap body 40. Due to the series of linkages, the cam locking surface 58 is in its most extended radial position from the adapter ring 30. In the fastened position, as shown in FIG. 3, the handle 60 is in its most downward position toward the cap body 40. The cam locking surface 58 engages the flat 36 on the circumferential flange 34 of the adapter ring 30. Due to the rotation of the cam 56 relative to the cap body 40, the cam locking surface 58 introduces an axial force on the flat 36 of the circumfrential flange 34. The distributed forces from both cams 56 urge the cap body 40 toward the adapter ring 30 to sealingly dispose the sealing gasket 46 between the inner surface 42 of the cap body 40 and the sealing surface 38 of the adapter ring 30.

In the fastened position, the handle pin 64 is axially closer to the cap body 40 then the link pin 53. As one skilled in the art will readily appreciate, this relative positioning coupled with the compressive load carried by the link 52 will push the handle 60 downward thus encouraging the fastening system 50 to remain in the fastened position. Notice that in the fastened position, the link lock hole 54 and the cap body lock hole 48 align thus providing the ability to lock the cap 10 in the fastened position and prevent unauthorized access to the fuel reservoir. Also notice that in the fastened position, the cap 10 maintains a low profile to fit within a recessed cavity.

The valve system 100 has open and closed positions. In the closed position, the O-ring 107 is sealingly disposed between the valving member 102 and the valve seat 122 located on the valve body 120. In this position, the flow path 124 is obstructed by the valving member 102 thus preventing fluid communication between the inlet 125 and the outlet 126. The compressed spring 130 places an upward axial load on the retainer cap 114, which is translated through the valve stem 103 to the valving member 102. As one skilled in the art will readily appreciate, this load urges the valving member 102 to sealingly dispose the O-ring 107 between the valving member 102 and the valve seat 122, thus closing the valve system 100. In operation, the spring 130 encourages the valve system 100 to remain in the closed position unless otherwise opened. If the valve system 100 is closed and the cap 10 is fastened and sealed to the adapter ring 30, then the fuel reservoir will be sealed and capable of maintaining a pressure.

An operator may selectivdy open this valve system 100 to the open position by manually placing a downward axial load on the retainer cap button 116. This load will translate through the valve stem 103 to the valving member 102. In turn, the valving member 102 will move downward relative to the valve body 120 thus disengaging the O-ring 107 seal between the valving member 102 and valve seat 122. Once the O-ring 107 seal is disengaged, the valving member 102 no longer obstructs the flow path 124 resulting in fluid communication between the inlet 125 and the outlet 126. If the operator releases the downward axial load, the spring 130 will return the valve system 100 to the closed position.

Having established fluid communication between the inlet 125, which is exposed to the pressurized gaseous media contained in the fuel reservoir, and the outlet 126, which is exposed to an external volume, the pressurized gaseous media will flow to the external volume. If the inlet, outlet, or flow path, are sufficiently small, such a valve system 100 can permit a slow and controlled release of the pressurized gaseous media. Once the pressure within the fuel reservoir has been adequately reduced, the operator can unfasten and remove the cap 10 from the adapter ring 30 and subsequently access the fill pipe 20.

Notice that the handle 60 covers the valve body 120 and allows the retainer cap button 116 to extend through the retainer cap hole 68 only when the cap is fastened. This configuration serves to protect the components of the valve system 100 from rough treatment or operator abuse, such as the dropping of the cap. Furthermore, notice how the valving member 102, the O-ring 107, and the valve seat 122 are all contained within the retainer cage recess 112. Such containment protects those components from rough treatment or operator abuse.

The foregoing description of a preferred embodiment of the invention has been presented for purposes of illustration and description. It is not intended to be exhaustive nor to limit the invention to the precise form disclosed. Many alternatives, modifications and variations will be apparent to those skilled in the art in light of the above teaching. Accordingly, this invention is intended to embrace all such alternatives, modifications and variations that fall within the spirit and broad scope of the appended claims.

What is claimed is:

1. An apparatus for sealing the end of a fill pipe connected to a fuel reservoir containing pressurized gaseous media, comprising:

(a) an adapter ring adapted for connecting to the end of the fill pipe;

(b) a cap for sealing the end of the fill pipe adapted for mounting onto the end of the adapter ring, said cap including a cap body having an inner surface adapted for at least partial exposure to the pressurized gaseous media contained in the fuel reservoir and an outer surface adapted for at least partial exposure to ambient atmosphere;

(c) a sealing member for sealing between the inner surface of the cap body and the adapter ring;

(d) a fastening system for fastening the cap body to the adapter ring, said fastening system including a handle adapted to effectuate manual movement of the fastening system for selectively releasing the cap body from the adapter ring; and (e) a valve system at least partially enclosed and protected by the fastening system for venting the pressurized gaseous media in the fuel reservoir, the valve system having an inlet exposed to the pressurized gaseous media contained in the fuel reservoir, an outlet exposed to a volume external to the reservoir, a flow path extending through the cap body between the inlet and the outlet, and a valving member movably disposed in the flow path and being externally activatable while the cap is fastened to the adapter ring to selectively provide fluid communication between the inlet and the outlet.

2. An apparatus as recited in claim 1, wherein the valve system further comprises a valve body at least partially defining the flow path and a valve sealing member adapted to be sealingly disposed between the valve body and the valving member.

3. An apparatus as recited in claim 2, wherein the valve system further comprises a means for urging the valving member to sealingly dispose the valve sealing member between the valving member and the valve body.

4. An apparatus as recited in claim 3, wherein the means for urging includes a spring for compressing the valve sealing member between the valving member and the valve body.

5. An apparatus as recited in claim 2, wherein the valve system further comprises a means for manually moving the valving member relative to the valve body to selectively disengage the valve sealing member seal between the valving member and valve body.

6. An apparatus as recited in claim 2, wherein the valve sealing member is an O-ring.

7. An apparatus as recited in claim 1, wherein the volume external to the reservoir is ambient atmosphere.

8. An apparatus as recited in claim 1, wherein the means for fastening includes a means for urging the cap body toward the adapter ring and sealingly dispose the sealing member between the inner surface of the cap body and the adapter ring.

9. An apparatus as recited in claim 1, wherein the adapter ring is connected to the fill pipe using cooperating threads.

10. An apparatus as recited in claim 1, wherein sealing member for sealing between the inner surface of the cap body and the adapter ring is a gasket seal.

11. A method for accessing the end of a fill pipe that is sealed by a cap and connected to a fuel reservoir containing pressurized gaseous media, comprising the steps of:

(a) manually opening a valve system by external activation, the valve system being at least partially enclosed and protected by a fastening system, said valve system having a flow path extending through the cap, the flow path having one end exposed to the pressurized gaseous media contained in the fuel reservoir and the other end exposed to a volume external to the reservoir, to selectively provide fluid communication between the pressurized gaseous media and the volume external to the reservoir;

(b) reducing the pressure in the fuel reservoir by releasing the pressurized media contained in the reservoir to the volume external to the reservoir;

(c) operating the fastening system to unfasten the cap from the end of the fill pipe; and (d) removing the cap from the end of the fill pipe.

12. A method as recited in claim 11, wherein the volume external to the reservoir in step (b) is ambient atmosphere.

* * * * *